US007618162B1

(12) United States Patent
Parkyn et al.

(10) Patent No.: US 7,618,162 B1
(45) Date of Patent: Nov. 17, 2009

(54) IRRADIANCE-REDISTRIBUTION LENS AND ITS APPLICATIONS TO LED DOWNLIGHTS

(75) Inventors: William A. Parkyn, Lomita, CA (US); David G. Pelka, Los Angeles, CA (US)

(73) Assignee: InteLED Corp., Huntington Beach, CA (US)

(*) Notice: Subject to any disclaimer, the term of this patent is extended or adjusted under 35 U.S.C. 154(b) by 0 days.

(21) Appl. No.: 11/271,420

(22) Filed: Nov. 9, 2005

Related U.S. Application Data

(60) Provisional application No. 60/627,287, filed on Nov. 12, 2004.

(51) Int. Cl.
*F21V 5/04* (2006.01)

(52) U.S. Cl. ........................ 362/335; 362/334; 362/336; 362/340; 362/800

(58) Field of Classification Search ................ None
See application file for complete search history.

(56) References Cited

U.S. PATENT DOCUMENTS

| | | | | |
|---|---|---|---|---|
| 3,470,561 A | * | 9/1969 | Horst | 343/911 R |
| 3,754,814 A | * | 8/1973 | Leith | 359/599 |
| 4,655,539 A | * | 4/1987 | Caulfield et al. | 359/9 |
| 5,339,177 A | * | 8/1994 | Jenkins et al. | 359/35 |
| 5,600,487 A | * | 2/1997 | Kiyomoto et al. | 359/634 |
| 5,607,492 A | * | 3/1997 | Doric | 65/17.4 |
| 5,924,788 A | * | 7/1999 | Parkyn, Jr. | 362/329 |
| 6,433,936 B1 | * | 8/2002 | Carpenter et al. | 359/652 |
| 2004/0228131 A1 | * | 11/2004 | Minano et al. | 362/307 |
| 2007/0109615 A1 | * | 5/2007 | Wunderer | 358/509 |

* cited by examiner

*Primary Examiner*—Bao Q Truong
*Assistant Examiner*—Danielle Allen
(74) *Attorney, Agent, or Firm*—William W. Haefliger

(57) ABSTRACT

An illumination-redistribution lens comprising a thick aspheric lens collecting a high proportion of the luminous output of a compact LED with a quasi-hemispheric pattern. After receiving the highly nonuniform illuminance from the nearby LED, the lower surface refractively deflects these rays into a less diverging angular pattern that results in uniform illuminance on the upper surface of the lens, which itself is shaped so its distribution of slope angles refractively deflects the uniform illuminance distribution into an exiting beam that will produce uniform illuminance on a distant target, such as a table below a ceiling-mounted unit. When square-cut sections of such lenses are laterally arrayed to form a downlight, a uniform rectangular spot will be produced on the target.

45 Claims, 11 Drawing Sheets

IRRADIANCE-REDISTRIBUTION LENS AND ITS APPLICATIONS TO LED DOWNLIGHTS

This application is based on provisional application Ser. No. 60/627,287 filed Nov. 12, 2004.

BACKGROUND OF THE INVENTION

Illumination lenses act to collect light from a source and gather it into a useful beam to cast upon a target. Frequently, uniform illumination is desired, but most often not attained. Sometimes this is because the target, such as a room's floor, has widely varying distance and slant to the luminaire, so that uniform intensity becomes nonuniform illumination. In most cases, though, the luminaire itself has widely varying distance from its light source to its different light-redirecting sections. Thus both mirrors and lenses typically have nonuniform illumination across their exit apertures. The present invention addresses this problem with a general method of making a lens achieve uniform exit-aperture irradiance as well as uniform target irradiance. This capability is particularly important for the next generation of high-brightness light-emitting diodes (LEDs). Their comparatively high cost per lumen puts a premium on luminaire uniformity and efficiency, for which the present invention provides a significant boost.

A particular illumination field for such a device is downlights, ubiquitously seen in ceilings as comprising an incandescent spotlight bulb in a recessed can. These 50-100 W lamps must typically be replaced at least once per year. An LED downlight would be of great benefit, due to the much lower power consumption and ten times longer life of LEDs. Also, the low voltage of LEDs would enable LED downlights to be installed without the extremely high price of licensed electricians who must be used to install the otherwise low-priced conventional downlight cans.

Conventional LED optics, however, provide neither uniform output nor the high directionality required for a downlight to produce, for example, a small spot of light on a table. A standard target, moreover, is not round but a three-foot square that is nine feet distant from the lamp. Currently only expensive and bulky projection lamps can produce a square light beam, and quite inefficiently at that, by using large lenses to form an image of a square aperture placed in the output beam of a collimating lens or mirror that uses an incandescent lamp.

The present invention remedies the current lack of suitable optics for LED downlights, and in particular provides an LED downlight with a square spot.

SUMMARY OF THE INVENTION

The present invention relates generally to illumination lenses, especially for LEDs, that produce uniform output-irradiance from highly nonuniform inputs. In particular, the present invention discloses several LED downlights providing marked improvements over the conventional cans. In general form the present invention comprises a thick aspheric lens lying close to a quasi-hemispheric light source, typically an LED but possibly a combination of incandescent lamp and reflector. The lower surface of the lens acts primarily to redistribute the flux it receives by refracting it in such a way that it has a uniform distribution by the time it has intercepted the front surface, which typically has the form of a thick aspheric section. This top surface then refracts the uniform distribution into a suitable beam.

One preferred embodiment of this new lens produces a very tightly collimated beam with uniform irradiance. This is advantageous for LED downlights because different diffuser-covers can go across this beam to produce a variety of circular or elliptical beam patterns, albeit with fuzzy boundaries.

Another preferred embodiment produces a square diverging beam that uniformly illuminates a square target, a valuable trait for LED downlights, particularly because of the sharp boundary of the square.

These and other objects and advantages of the invention, as well as the details of an illustrative embodiment, will be more fully understood from the following specification and drawings, in which;

DRAWING DESCRIPTION

Figure 8:
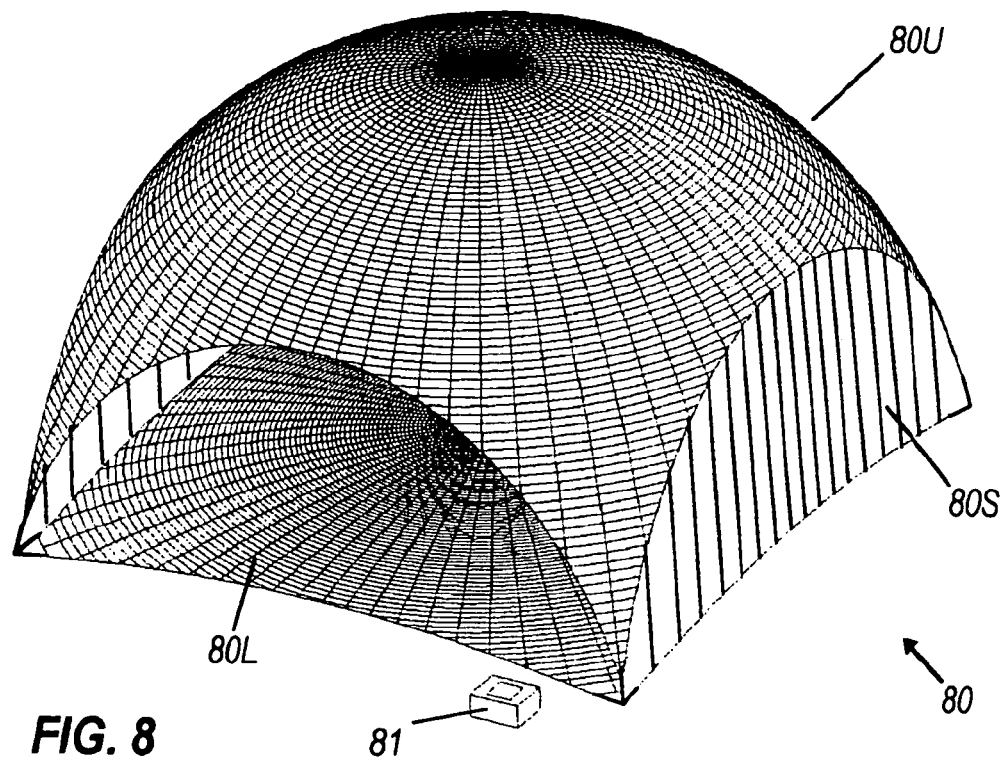
Figure 9:
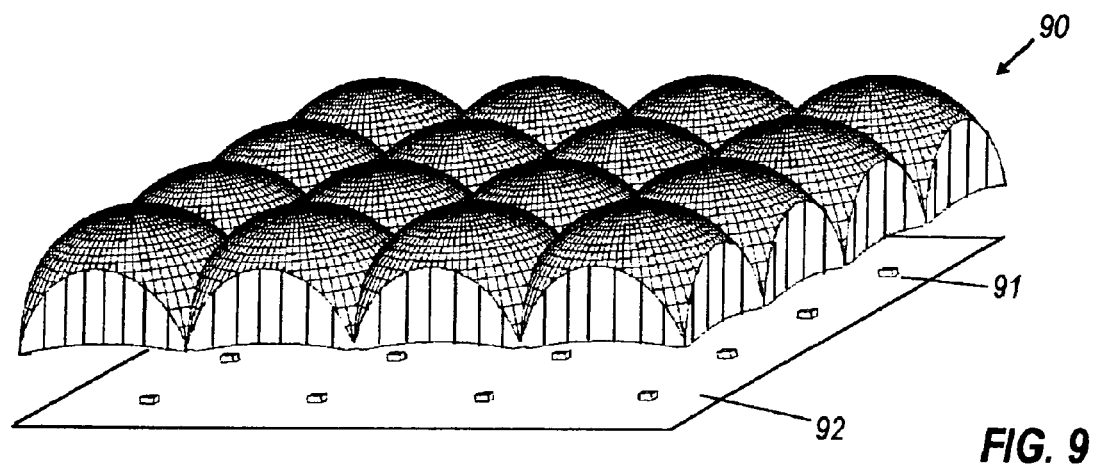
Figure 10:
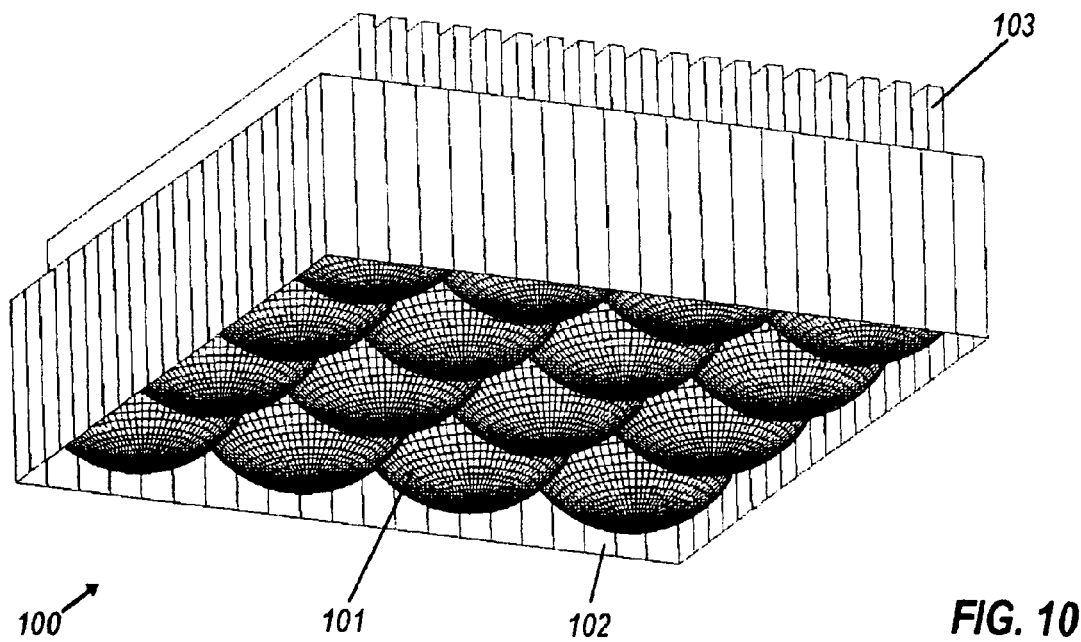
Figure 11:
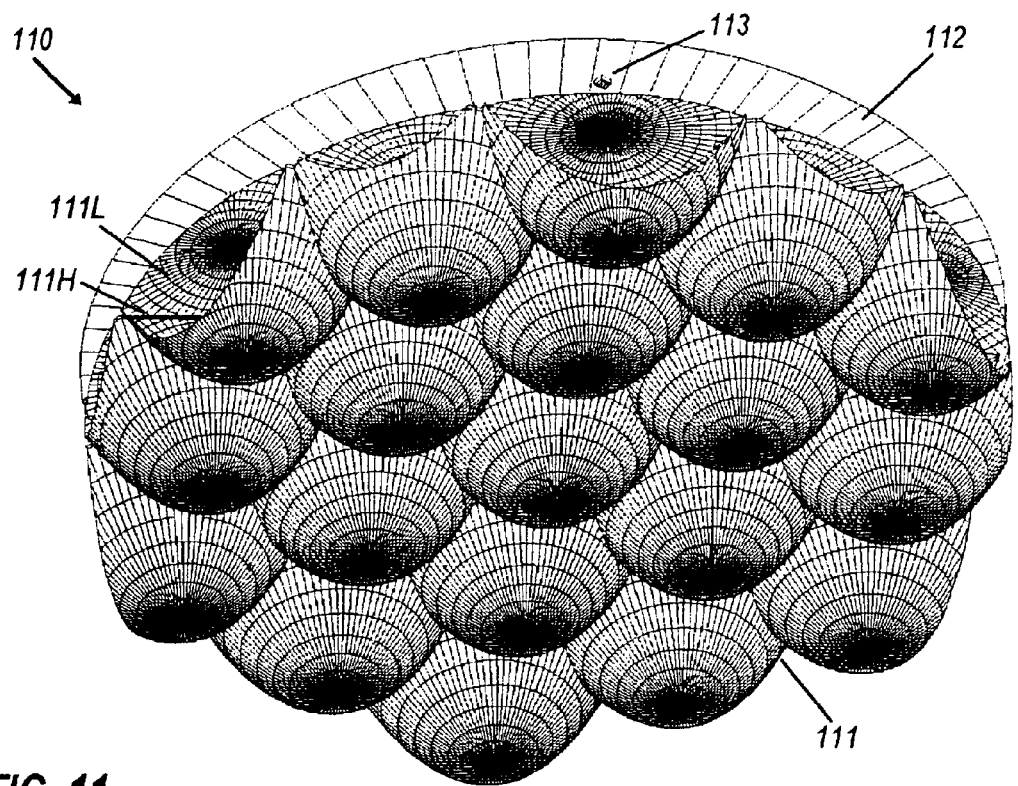
Figure 11A:
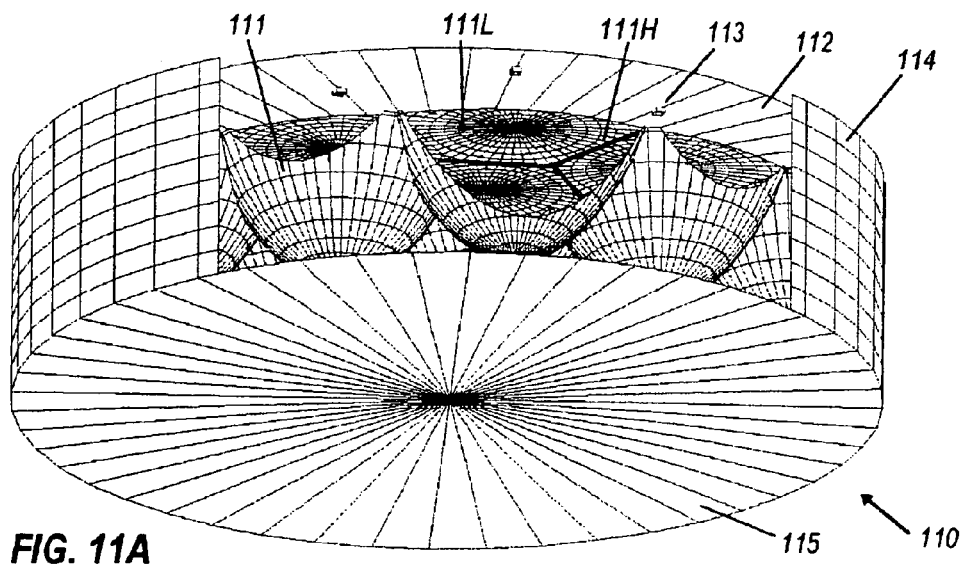
Figure 12:
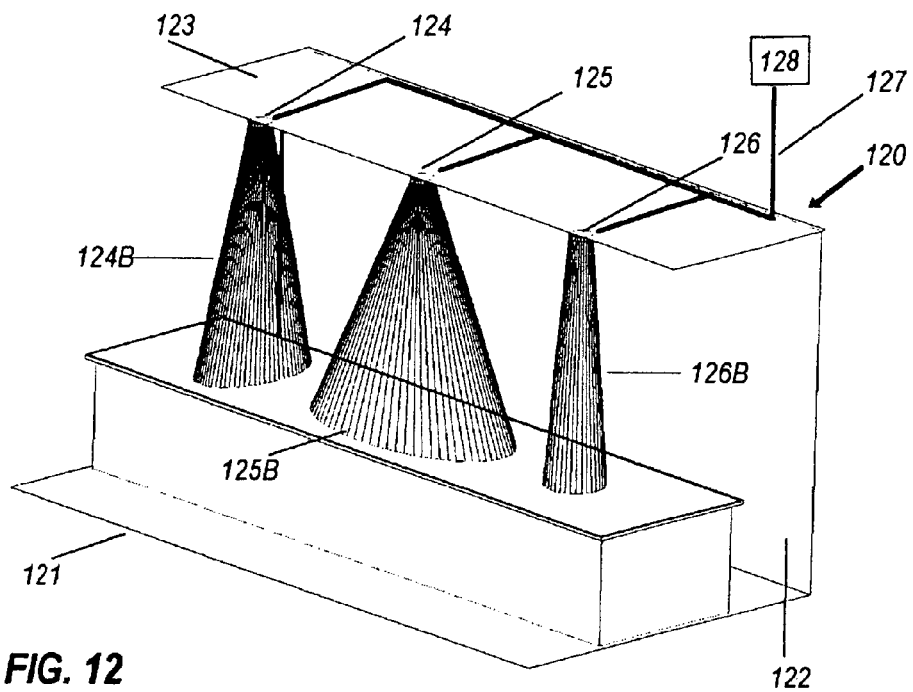
Figure 13:
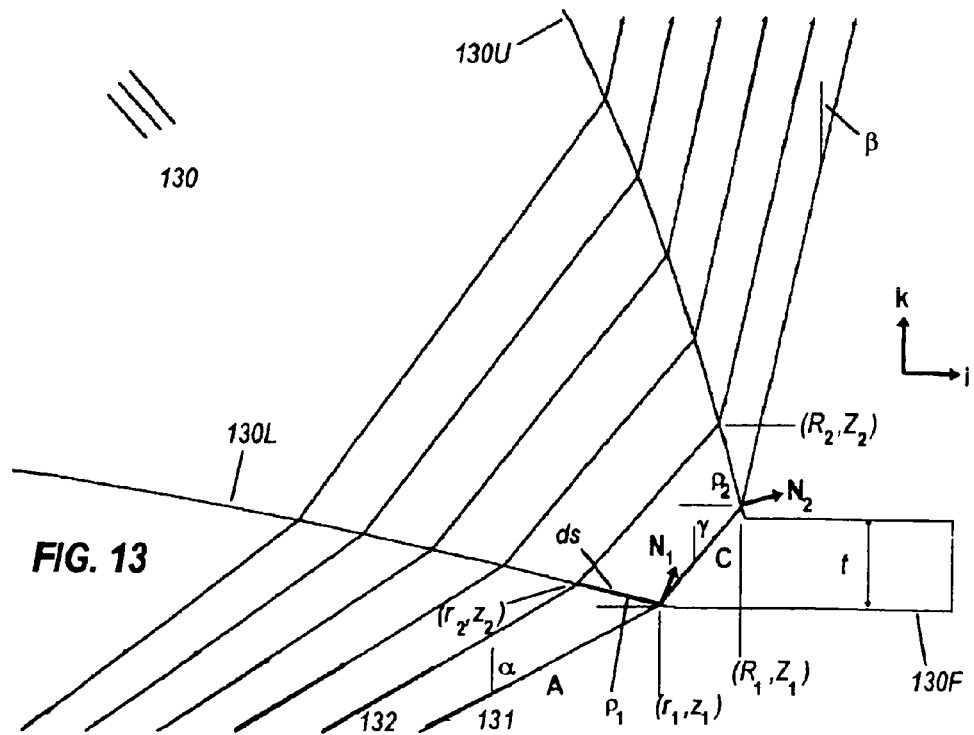
Figure 14:
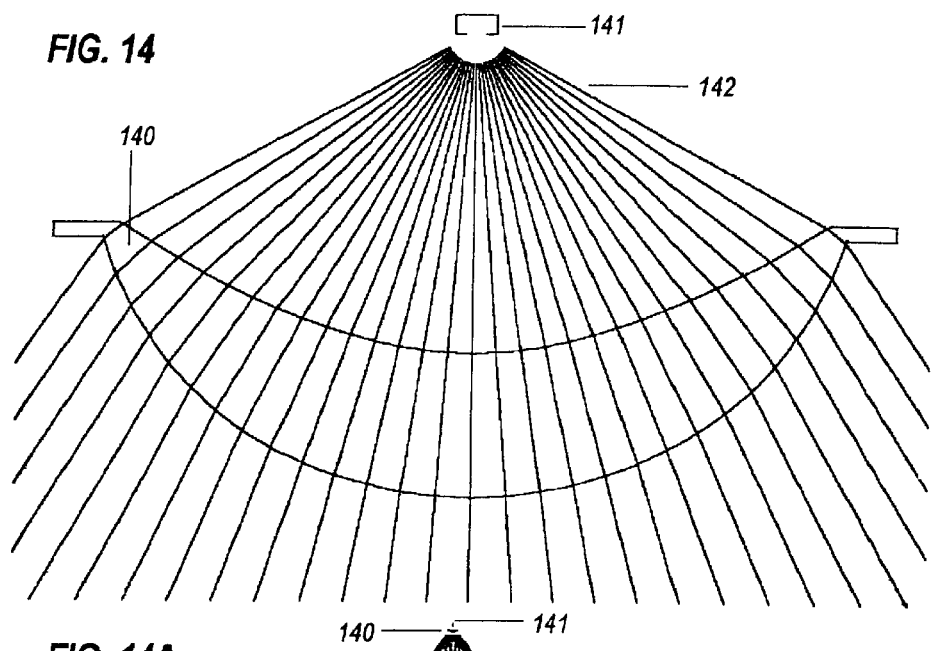
Figure 14A:
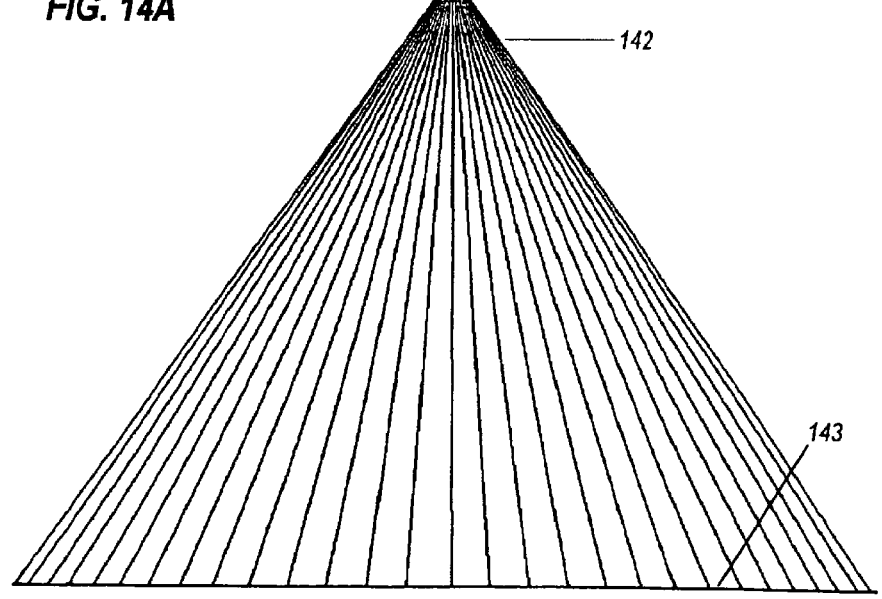
Figure 15A:
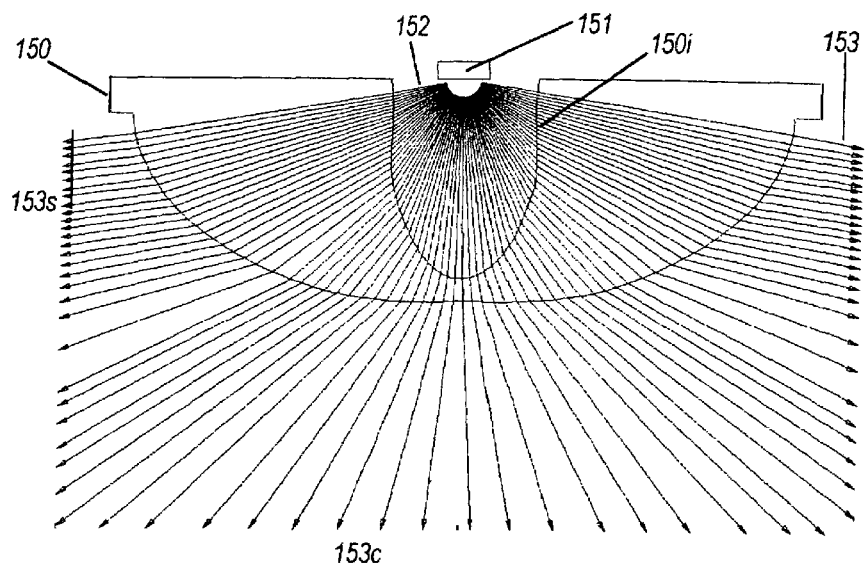
Figure 15B:
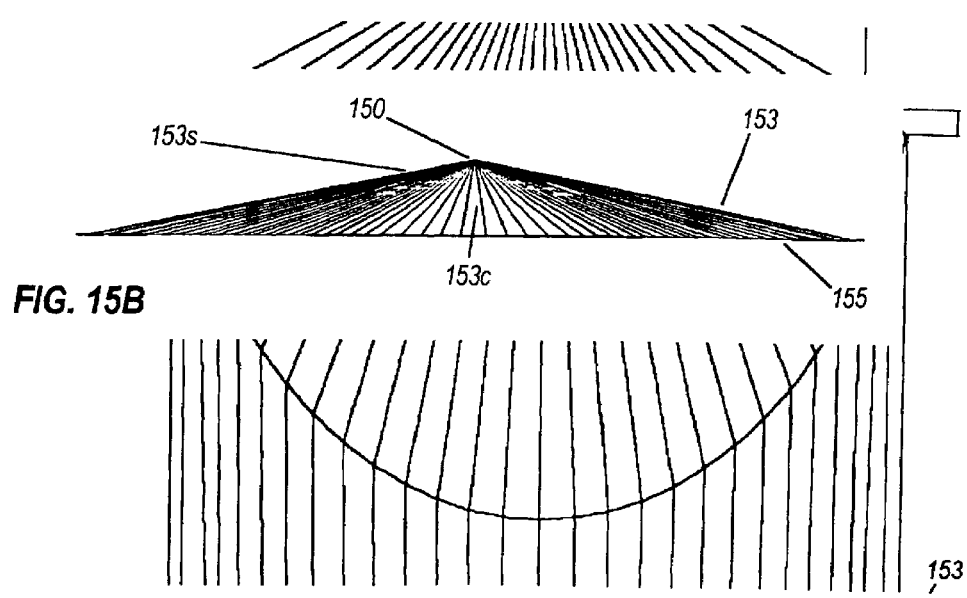
Figure 16:
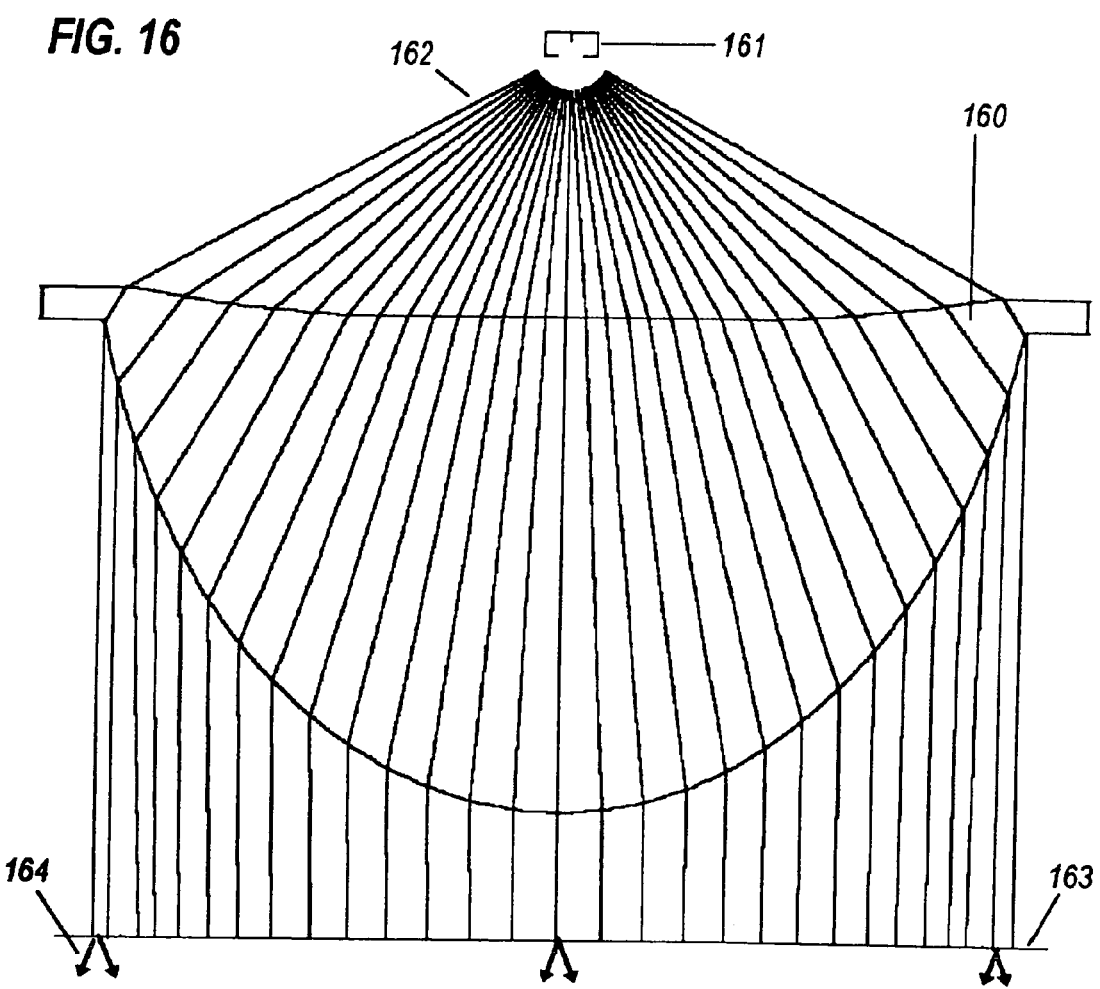

FIG. 8. shows the squared-off lens making a square illuminance distribution;

FIG. 9 shows an array of such squared-off lenses;

FIG. 10 shows a square downlight based on such an array;

FIG. 11 shows a hexagonal array of lenses;

FIG. 11A shows the entire downlight;

FIG. 12 shows downlights with different holographic diffusers, powered by low-voltage wiring;

FIG. 13 shows the mathematical generation of a lens profile;

FIG. 14 shows a wide-angle irradiance-redistribution lens;

FIG. 14A shows the beam of same;

FIG. 15A shows an extremely wide-angle irradiance-redistribution lens;

FIG. 15B shows the beam of same;

FIG. 16 shows a collimating irradiance-redistribution lens; and

Figure 17:
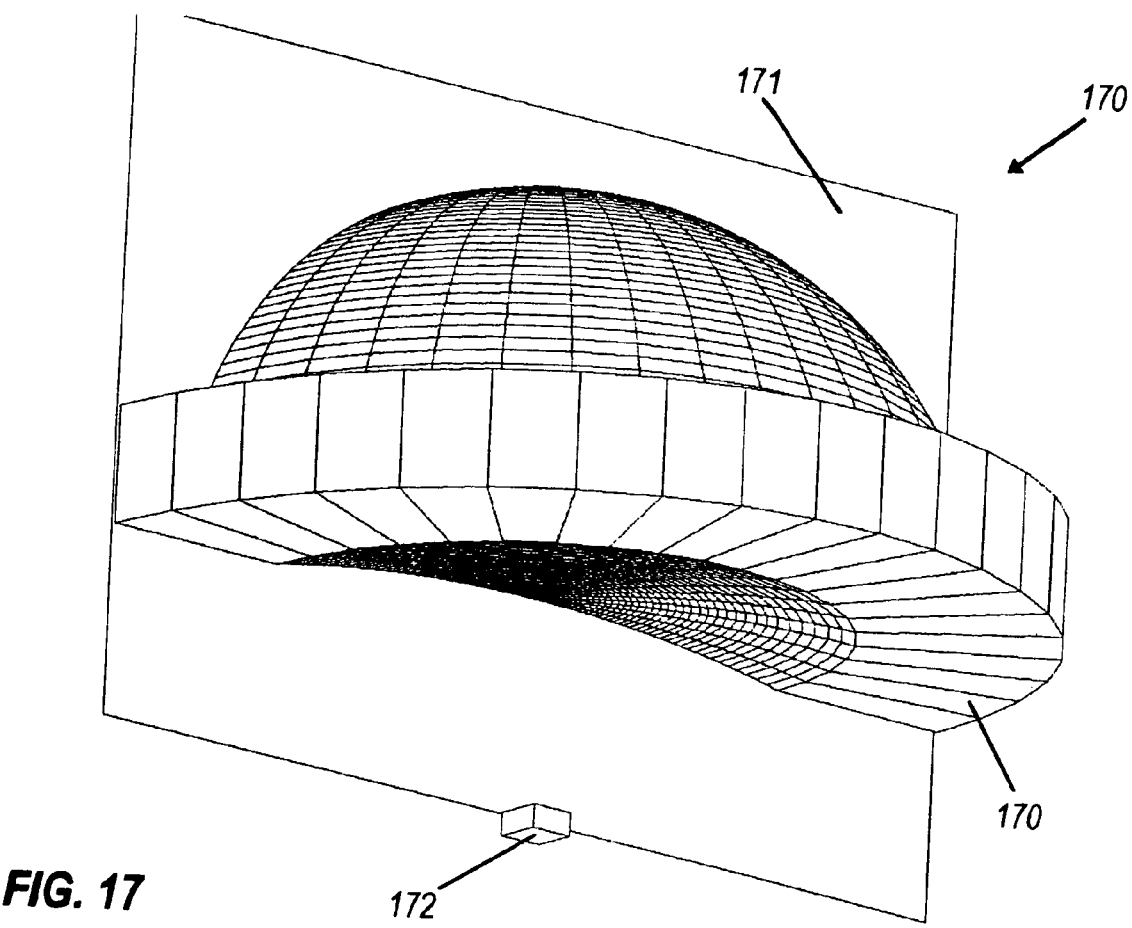

FIG. 17 shows a luminaire utilizing semicircular lens to form a semicircular output beam.

Corresponding reference characters indicate corresponding components throughout the several views of the drawings.

DETAILED DESCRIPTION

Figure 1:
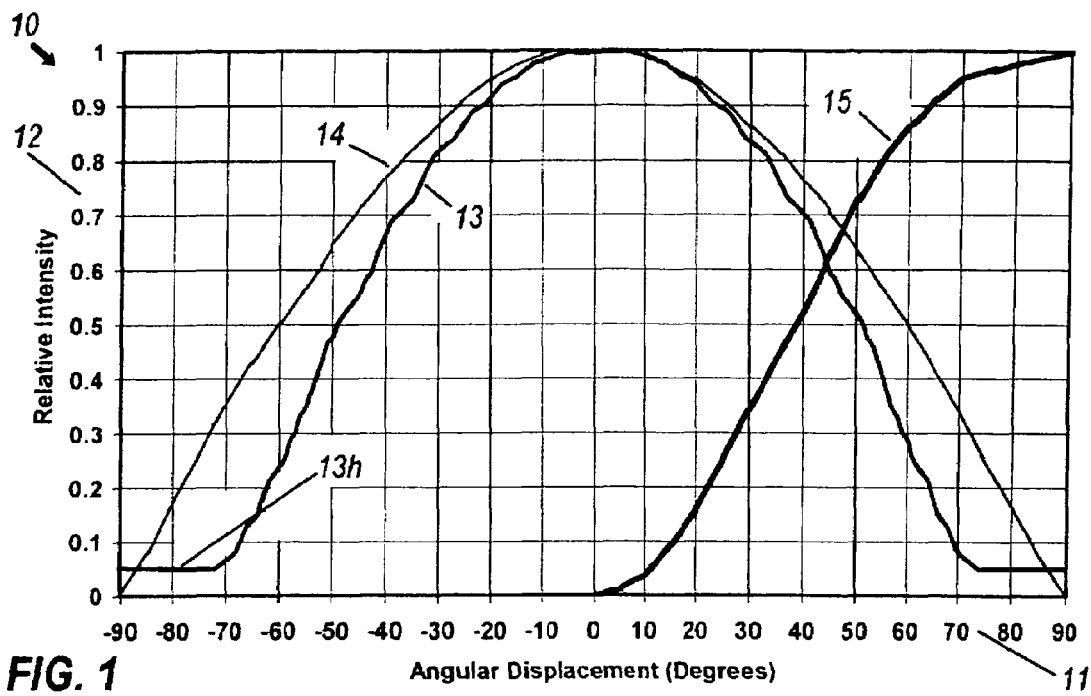
FIG. 1 is an intensity graph showing the distinction between Lambertian and sub-Lambertian emitters.

A Lambertian light source presents constant luminance at all angles, so that off-axis foreshortening of its flat output aperture gives a cosine dependence of intensity. Actual LED chips can differ from this ideal pattern. FIG. 1, as an example, shows intensity graph 10 with horizontal angular scale 11 and vertical scale 12 showing relative intensity. Curve 13 is the measured output of the Flash-LED made by the Lumileds Corporation. For comparison, curve 14 graphs the cosine dependence of a perfectly Lambertian emitter, showing that curve 13 may be called 'sub-Lambertian', in spite of horizontal branch 13$h$. This latter feature is due to lateral leakage out of the top of the Flash package.

An important feature of an intensity distribution is the cumulative flux distribution, defined as the normalized angular integral of the intensity I($\theta$):

$$J(\psi) = {}_0\int^\psi I(\theta)\sin\theta d\theta / {}_0\int^{90} I(\theta)\sin\theta d\theta$$

Curve 15 graphs this function, showing that 90% of the flux lies within 63° of the axis, a solid angle equal to half that of a hemisphere's $2\pi$ steradians. A Lambertian emitter, however, has the cumulative function $\sin^2(\theta)$, equal to 79% at 63°.

Figure 2:
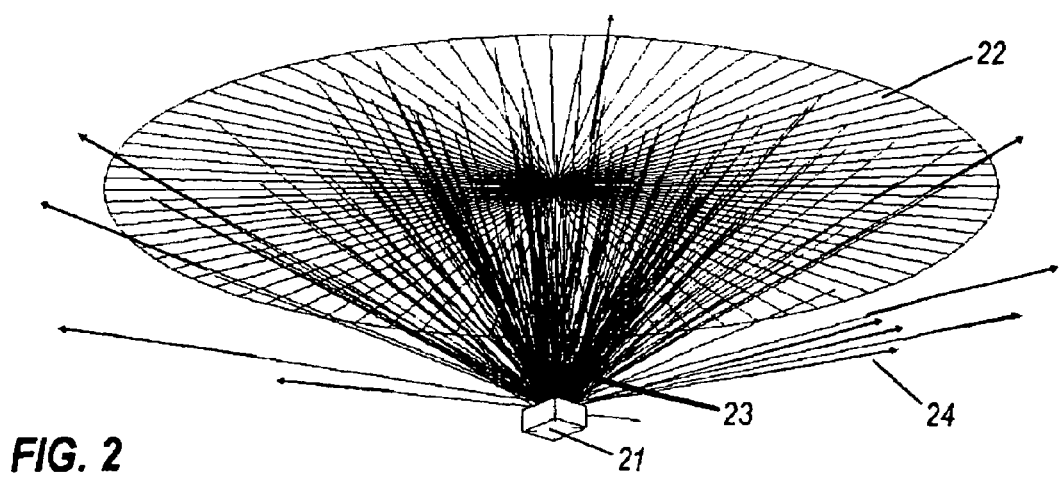
FIG. 2 shows a receiving aperture and a nearby compact light-emitter.

Both the ideal Lambertian emitter and the Flash LED emit into a hemisphere of solid angle, with far more than half their output going into half the hemisphere. Such emitters can be called 'quasi-hemispheric'. For their luminosity to be usefully collected, quasi-hemispheric emitters require wide-angle illumination optics. FIG. 2 is a perspective view of such a situation, showing Flash LED 21 illuminating nearby flat aperture 22, which subtends a 63° half angle. Quasi-hemispheric emission 23 can be seen to be vertically stronger, because it has the intensity distribution of curve 13 of FIG. 1, so that 90% of its rays are intercepted by aperture 22. Arrowed rays 24 represent the 10% of the emission missing the lens because they fall in the lower half-hemisphere of solid angle. Because the outer portions of aperture 22 are much further away than the center, with the less intense off-axis rays hitting it at a slant, the illumination distribution across 22 is far more nonuniform than emission 23 itself.

Figure 3:
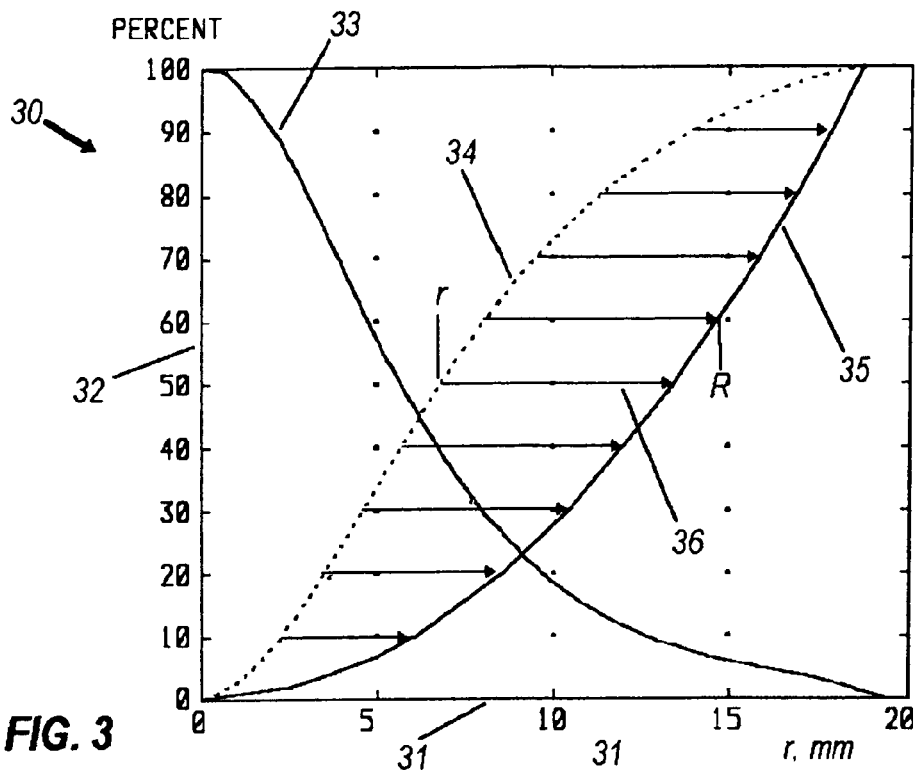
FIG. 3 shows the highly nonuniform distribution of irradiance across the aperture, and compares its cumulative distribution with that of uniform irradiance.

For aperture 22, FIG. 3 shows normalized illuminance graph 30 with horizontal scale 31, in radial millimeters from aperture center, and vertical scale 32 in percent. Curve 33 graphs the highly nonuniform relative illuminance on the aperture. Broken-line curve 34 shows the relative encircled flux for radius r along scale 31. Parabolic curve 35 is the cumulative distribution for uniform illuminance. Arrows 36 run horizontally from curve 34 to curve 35 to show how the nonuniform illuminance of curve 33 must be redistributed radially outward to produce uniform illuminance. That is, the rays intercepting the aperture at radius r must be shifted outwards to radius R. Carrying out the redistribution function R[r] is an objective of the present invention, and this mapping of cumulative distributions constitutes its method of producing uniform illuminance from initial nonuniformity.

Figure 4:
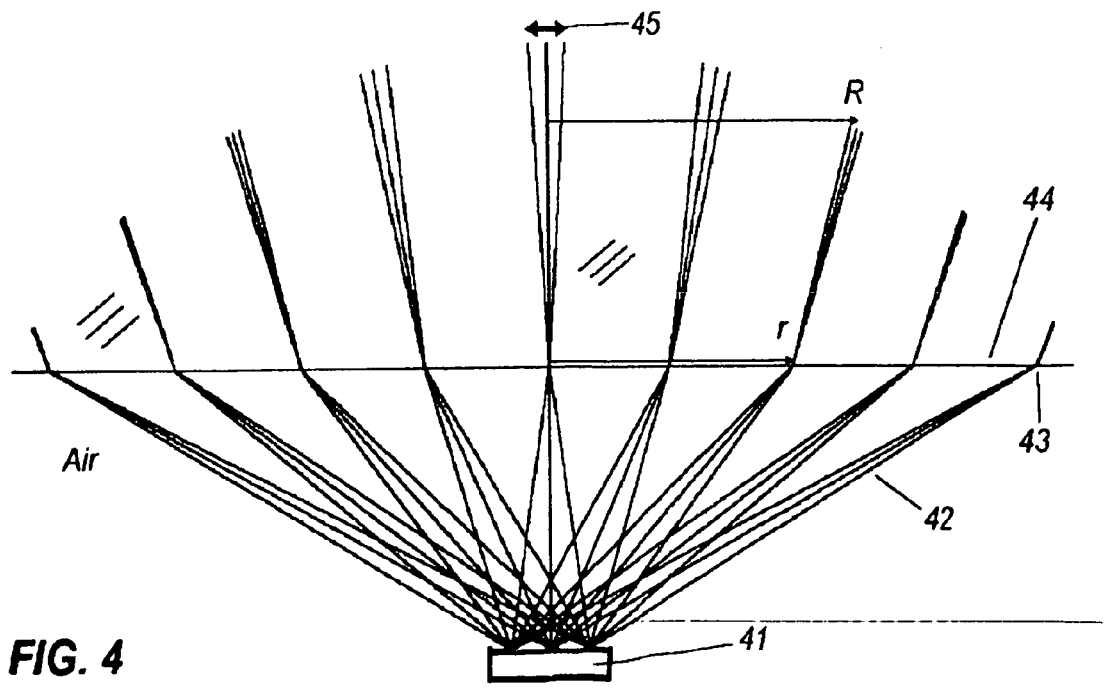
FIG. 4 shows how finite source size causes a lateral spread of received rays refracted through a flat aperture.

FIG. 4 shows LED package 41 sending ray-triplets 42 to points 43 on refracting flat surface 44 of a transparent dielectric. Note the relatively small size (a few square millimeters) of the emitter to the relatively large size (hundreds of mm$^2$) of the aperture. Such a small emitter is termed a 'compact' light source, and is said to be 'nearby' from such a wide-angle aperture. This source-compactness means that above aperture 44 source 41 subtends small angle 45. This means that deflecting a ray triplet from r to R will not greatly spread out the flux received at point r. FIG. 4 shows the different ray-triplets 42 stopping at different heights, deliberately suggestive of an upper surface to go with surface 44. In fact, such a configuration, of redistributive lower surface and beam-forming convex upper surface, encompasses all preferred embodiments of the present invention. The ratio shown in FIG. 4 of the width of emitter 41 to that of receiving surface 44 is the cause of the narrow spread 45 of the luminosity through any point 43. If emitter 41 were made even larger, a size would eventually be reached that where the R[r] function did not deliver uniform illuminance. Said ratio in FIG. 4 is less than $\frac{1}{5}$.

Figure 5:
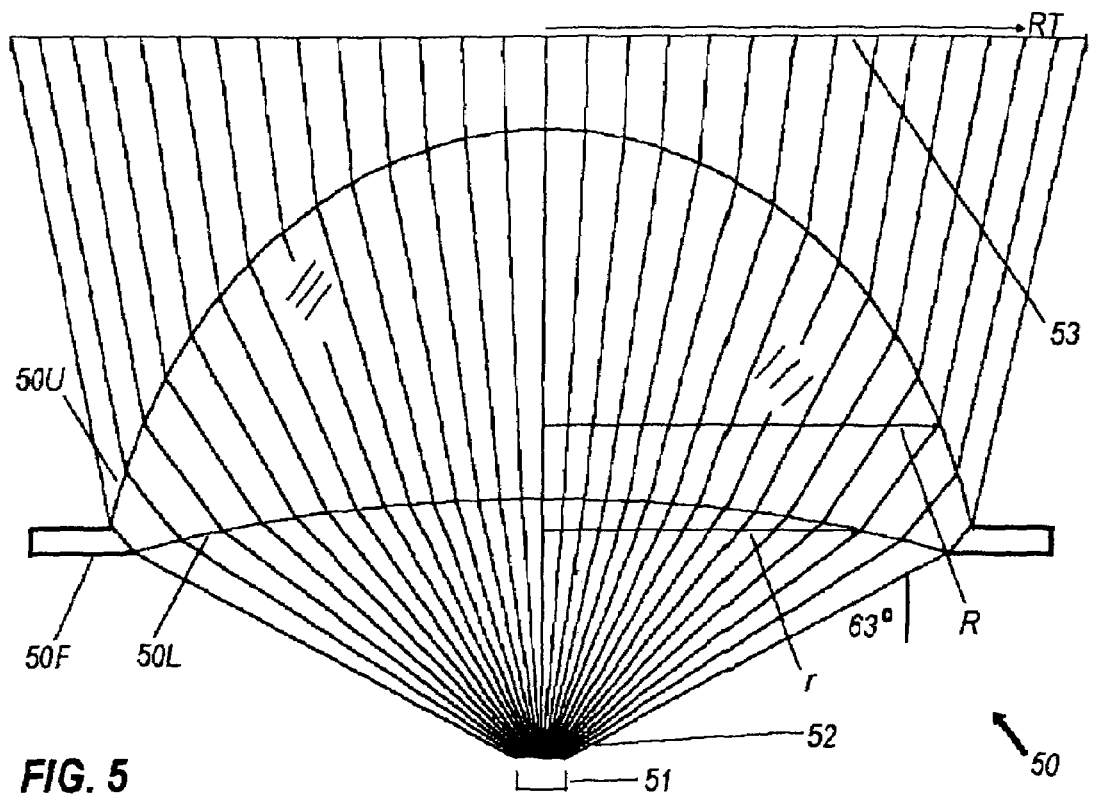
FIG. 5 shows an irradiance-redistribution lens.

FIG. 5 shows a preferred embodiment in profile 50 of a 35 mm-diameter circularly symmetric illumination-redistribution lens formed of polycarbonate and comprising concave lower surface 50L, upper exit-surface 50U, and optically inactive flange 50F. Flash LED 51 emits ray-fan 52, extending to 63° off-axis and thereby representing 90% of the luminosity of source 51. Rays 52 are received along concave lower surface 50L, each at a radius r. A diagram quite similar to FIG. 3 would describe the encircled flux at each radius r and give it the corresponding top-surface radius R. Both r and R are shown in FIG. 5.

Furthermore in FIG. 5, the ray going from radius r on lower surface 50L to radius R on upper surface 50U is refractively deflected therefrom toward radius RT on target surface 53, herein shown for clarity in close proximity to lens profile 50, but customarily more distant. Radius RT on target 53 follows a parabolic profile of encircled flux, a property of uniform illuminance thereupon.

Figure 6:
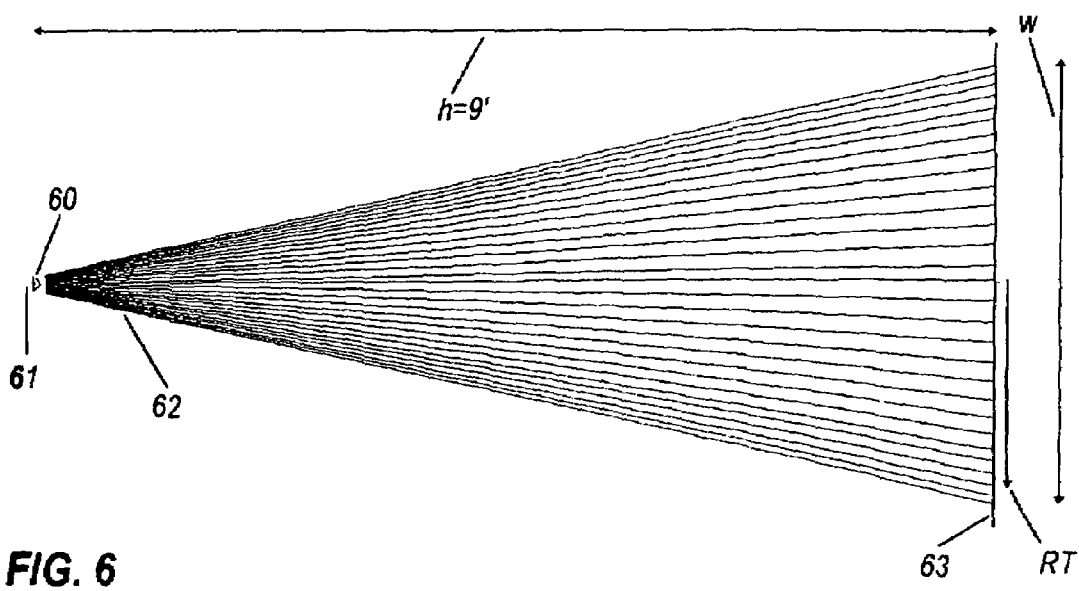
FIG. 6 shows how this lens uniformly illuminates a standard target.

FIG. 6 shows the practical situation for which the present invention is especially useful, diagonal 63 of a 3-ft square at distance h=9' from lens 60 forming beam 62 from LED source 61. Distance RT is in correspondence with that of FIG. 5, as a part of uniform illumination of target 63. This is a common commercial lighting specification, but a square pattern does not seem to be commercially available today except via bulky and expensive imaging-spotlights, a market deficit the present invention ably remedies.

Figure 7:
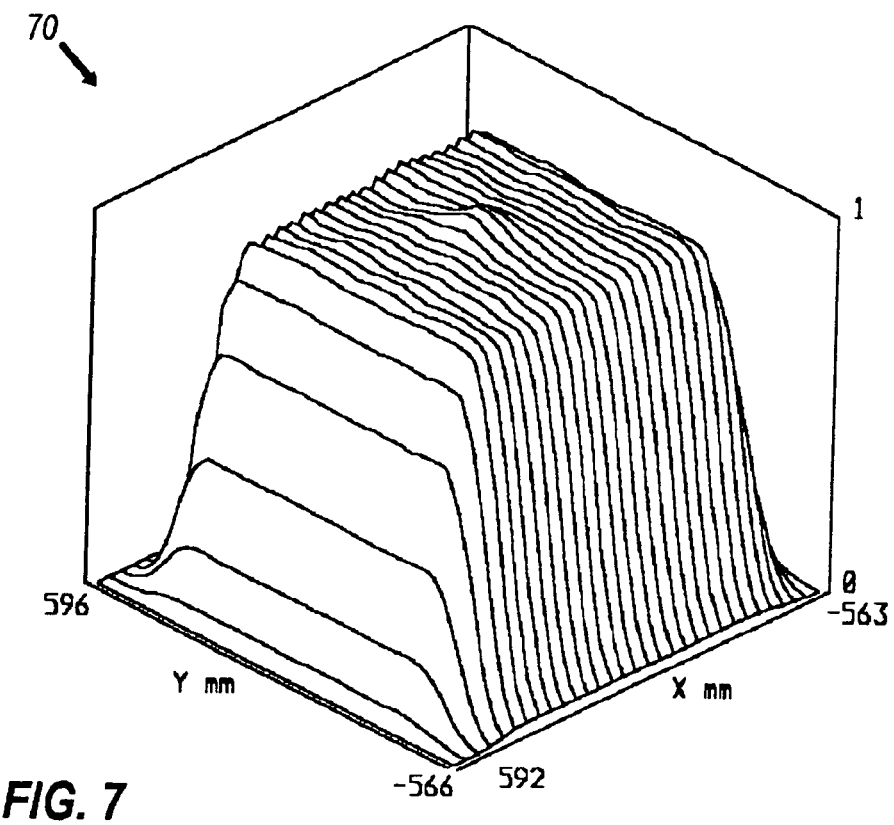
FIG. 7 shows the square distribution possible with this lens.

FIG. 7 shows a square illumination pattern in the form of flux pattern 70, a perspective view of a flat-topped square distribution over x and y coordinate scales in mm.

FIG. 8 shows the preferred embodiment producing the pattern of FIG. 7. Illumination lens 80 comprises upper surface 80U, vertical planar side walls 80S, one of which is removed, and lower surface 80L. Just below lens 80 is nearby compact light source 81.

FIG. 9 shows an array of such squared-off lenses. Array 90 is positioned above sources 91, which are mounted on circuit board 92.

Illustrating the use of such a lens array, FIG. 10 shows downlight 100, comprising lens array 101, case 102, and rectangular convective heat-sink fins 103, oversized for longer operating life of the LEDs they cool (not shown).

FIG. 11 shows how the lens of FIG. 5 can be hexagonally packed into a circular configuration. Downlight 110 comprises an array of 17 lenses 111. It is positioned over round circuit board 112 upon which are mounted LEDs 113. Lower lens surfaces 111L are visible, also showing hexagonal-cell boundary-line 111H. Although this configuration will produce a round spot instead of a square, more of the luminosity of its LEDs will end up in its beam.

FIG. 11A shows downlight 110 from another angle, as well as case 114 and translucent cover 115. Case 114 is cut away to reveal lenses 111, circuit board 112, and LEDs 113. Several lower lens surfaces 111L are visible, as well as hexagonal-cell boundary-lines 111H.

It is possible to utilize a holographic diffuser on the translucent cover, to alter the beam pattern for particular situations. In this case the lenses would make a narrow beam and different diffusers could be selected to get different wide beams. FIG. 12 shows the illumination function of the present invention. Alcove 120 comprises floor 121, wall 122, and false-ceiling 123. Display table 124 is illuminated by downlights 125, 126, & 127, respectively casting small elliptical beam 125B, large elliptical beam 126B, and tight circular beam 127B. Each of these beams is produced by a different version of the holographic diffuser on cover 115 of 11 of FIG. 11A. Low-voltage wiring system 127 is fed by low-voltage power supply 128.

It can be seen that differing distances and target sizes will call for lenses with somewhat differing profiles than that of FIGS. 5 & 6. Such profiles are circularly symmetric and generated by a differential equation relating the bottom-surface coordinates to the slope angle of the bottom surface, via the bottom-surface deflection angle required by value-matching the cumulative distribution C[r] of bottom illuminance with the parabolic distribution of uniform illuminance, $D[R] = (R/R_{MAX})^2$. That is, the deflection function $R[r]$ comes from inverting the redistribution equation $C\{r\} = D(R[r])$, as shown by the horizontal arrows of FIG. 3.

Given this function $R[r]$, the lens profile can be calculated by the method of FIG. 13, which is a close-up view of the edge of irradiance-redistribution lens 130, in the vicinity of flange 130F, showing lower surface 130L and upper surface 130U. The mathematical generation of lower surface 130L begins with its outer edge, at defined point (r,z). Flange 130F has defined thickness t, so that the corresponding initial point of upper surface 130U is (R,z+t). Vectors are expressed in terms of horizontal unit vector i and vertical unit vector k, so that the input ray vector of ray 131 is $A = i \sin\alpha + k \cos\alpha$, where $\alpha$ is the inclination of ray 131 from vertical vector k. The lower-surface inclination angle is $\rho_1$, so that the corresponding normal vector is $N_1 = i \cos\rho_1 + k \sin\rho_i$. Similarly on upper surface 130U having inclination angle $\rho_2$, the normal vector is $N_2 = i \cos\rho_2 + k \sin\rho_2$.

From initial points $(r_1, z_1)$ and $(R_1, Z_1)$, with $Z_1 = z_1 + t$, comes the interior angle $\gamma = \tan^{-1} t/(R-r)$, and thence the ray-vector $C = i \sin\gamma + k \cos\gamma$. The exit-angle $\beta$ is derived from the known target distance ZT and the known radius RT on the target, which is given by the requirements of uniform illumination thereupon: $\beta = \tan^{-1}(ZT - Z_1)/(RT - R_1)$. Thence ray-vector B is given by $B = i \sin\beta + k \cos\beta$. The normal vector $N_1$ is that which refracts A into C, and is given by $$N_1 = (C-A)/\|(C-A)\|$$

where $\|x\|$ is the scalar magnitude of vector x. Similarly on upper surface 130U, normal vector $N_2$ is that which refracts C into B:

$$N_2 = (B-C)/\|(B-C)\|$$

Given vector $N_1$, the next point on lower surface 130L is $(r_2, z_2)$ on ray 132, at small distance ds from the first point $(r_1, z_1)$. These next coordinates are given by $$r_2 = r_1 - ds \cos\rho_1 \quad z_2 = z_1 + ds \cos\rho_1$$

From lower-surface coordinate $r_2$ comes upper-surface coordinate $R_2 = R[r_2]$, from which can be calculated the other upper-surface coordinate: $Z_2 = Z_1 + \tan\rho_2(R_2 - R_1)$. By using small intervals ds, smooth surfaces 130L and 130U can thus be mathematically iterated from the periphery to the center, with different resultant shapes dependent upon the size and distance of the illumination target, such as target 63 of FIG. 6. The narrower the target, the thicker the lens, but uniform illumination is always the result.

FIG. 14 shows the profile of wide-angle irradiance-redistribution lens 140, illuminated by LED 141 with rays 142. FIG. 14A also shows target 143 uniformly illuminated by rays 142.

FIG. 15A shows the profile of extremely wide-angle irradiance-redistribution lens 150, illuminated by LED source 151, with rays 152 that illuminate the arched interior surface 150i, which advantageously can extend to the same level as source 151, more fully intercepting its light than previous, narrower-angle lenses. External rays 153 are shaped to uniformly illuminate a 160° wide planar target. Central rays 153c are diverging because the target center is so close, while side rays 153s are nearly collimated for illuminating the distance flanks of the target.

FIG. 15B is a side view of planar target 155 being uniformly illuminated by wide-angle rays 153 from lens 150, including central rays 153c and side rays 153s from FIG. 15A.

FIG. 16 shows the profile of collimating irradiance-redistribution lens 160, illuminated by LED 161 with rays 162 that uniformly illuminate target 163.

FIG. 17 is a perspective view of semicircular luminaire 170, comprising semilens 170, vertical planar mirror 171, and LED light source 172 adjacent thereto. This preferred embodiment produces a semicircular beam suitable for gaming tables of that shape.

The preceding description of the presently contemplated best mode of practicing the optical transformer described herein is not to be taken in a limiting sense, but is made merely for the purpose of describing the general principles of the invention. The scope of the invention should be determined with reference to the claims.

It will be appreciated by those skilled in the art, in view of these teachings, that alternative embodiments may be implemented without deviating from the spirit or scope of the invention. This invention is to be limited only by the following claims, which include all such embodiments and modifications when viewed in conjunction with the above specification and accompanying drawings.

We claim:

1. An irradiance-redistribution illumination lens comprising a transparent dielectric solid of revolution with external surface area predominantly comprised of an entry surface that receives light of nonuniform irradiance from a nearby compact light source and of an opposing exit surface that forms from said received light a pre-specified diverging output beam; said entry surface given a specific profile that refractively deflects said received light into a different solid angle, said entry surface spatially distributed such that said exit surface receives said deflected light with predominantly uniform irradiance, said exit surface given a specific shape that refractively deflects said uniform irradiance into said output beam; said light source being sufficiently compact for said specific shapes to be calculated by mathematical integration of the slope distributions required by said refractive deflections, said entry surface having first concavity facing toward said light source, and second concavity facing toward the entry surface, said second concavity being substantially greater than said first concavity.

2. The lens of claim 1 wherein said specific profile of said entry surface is calculated in concordance with the cumulative angular distribution of said received light; said concordance established by the correspondence of said distribution with equal values at wider radii of the shallower square-root distribution of uniform irradiance; said establishment embodied as the deflection function from each point of said entry surface to the wider radius on said exit surface having the same value of the cumulative distribution of uniform irradiance as the value at said entry-surface point of said cumulative distribution of said irradiance from said light source.

3. The lens of claim 2 wherein said specific shape of said exit face has the slope distribution that deflects said uniform irradiance into said pre-specified intensity distribution of said output beam.

4. The lens of claim 1 wherein said output beam has predominantly uniform intensity within a predetermined angular limit.

5. The lens of claim 1 wherein said output beam uniformly illuminates a target zone.

6. The lens of claim 5 wherein said target zone is on a plane facing said lens.

7. The lens of claim 5 also comprised of inactive lateral surfaces forming a rectangular limit of said exit face, so that said target zone is a similar rectangle.

8. The lens of claim 1 wherein said light source is a light emitting diode.

9. Multiple lenses as defined in claim 8 laterally arrayed in proximity, above multiple light sources, in association with a common circuit board, and having their output beams illuminating the same target.

10. An illumination system for producing a semicircular beam, comprising the lens of claim 1, modified by being cutting in half at a cutting plane, a mirrored surface associated with said cutting plane, and a compact light source adjacent thereto for illuminating the entry surface of said lens.

11. The lens of claim 1 wherein said output beam is collimated and also comprising an associated secondary lens for receiving said output beam and producing a specified diverging beam.

12. The lens of claim 11 wherein said secondary lens is a holographic diffuser.

13. The lens of claim 11 wherein said secondary lens is a lenslet array.

14. The lens of claim 1, and including multiple such lenses in the following combination:
   a) an array of aspheric lenses extending in side-by-side relation,
   b) an array of quasi-hemispheric light sources one for each lens,
   c) each source positioned to direct light at its corresponding lens, and the sources and lenses configured to produce light emitted from the lens array, the emitted light having substantially uniform intensity across an area corresponding to the area of the lens array.

15. The combination of claim 14 wherein said emitted light is substantially collimated.

16. The combination of claim 14 wherein the lenses have output sides which are generally dome shaped.

17. The combination of claim 14 wherein the lenses extend in edge to edge peripherally packed relation.

18. The combination of claim 14 wherein the lenses have peripheries which are polygonal.

19. The combination of claim 17 wherein the lenses have peripheries which are square.

20. The combination of claim 14 including relatively reduced size ball shaped lenses proximate said sources which are LEDs, and directing LED emitted light at the rear sides of said first mentioned lenses.

21. The combination of claim 14 wherein said lenses are oriented to direct light downwardly in a room, for room illumination.

22. The combination of claim 14 wherein there are spaced apart groups of said lenses oriented to direct light downwardly from the ceiling zone of a room, for room illumination.

23. The combination of claim 22 including an electrical DC conductor proximate said ceiling zone and to which said sources which are LEDs associated with said group of lenses are electrically connected.

24. The combination of claim 23 including an AC to DC converter connected to said line to convert AC current to low voltage DC current supplied to the LEDs in said group.

25. The combination of claim 14 wherein the sources are oriented in one of the following configurations:
   i) at an axis defined by a lens,
   ii) sidewardly spaced from an axis defined by the lens.

26. The combination of claim 14 wherein said sources are lambertian.

27. The lens of claim 1, and including multiple such lenses in combination with:
   a) an LED package comprising multiple LEDS, the lenses receiving light rays from the LEDs,
   b) and a transparent dielectric having a refracting flat surface to which rays from the LEDs are transmitted for refraction,
   c) the rays refracted from the LEDs at points along the flat surface extending in narrow bands.

28. The combination of claim 27 wherein the rays transmitted to each said point are triplet rays.

29. The combination of claim 27 wherein the overall width spacing of the LEDs in the package is small relative to the overall operative width of the flat surface receiving rays transmitted from the LEDs.

30. The combination of claim 29 wherein the ratio of said overall width spacing of the LEDs in the package to the operative width of the flat surface receiving the rays transmitted by the LEDs is less than ⅕, whereby substantially uniform illumination is produced by said refracted rays.

31. A light redistribution system comprising, in combination with a lens as defined in claim 1,
   a) LED means,
   b) the lens having a concave lower refracting surface receiving rays from said LED means,
   c) the lens having a dome-shaped refracting upper surface, the curvature of which is one of the following:
      i) exceeds the curvature of the lower surface,
      ii) is less than the curvature of the lower surface,
   d) a target surface receiving rays refracted by said upper surface,
   e) said LED means and said upper and lower surfaces configured to produce a profile of bounded flux at said target surface that provides substantially uniform illuminance.

32. The system of claim 31 wherein said bounded flux defines a substantially square pattern.

33. The system of claim 32 wherein the lens has four vertical planar side walls each intersecting said upper and lower surfaces.

34. An array of adjacent lenses as defined in claim 33.

35. The array of claim 34 including heat sink fins associated with said lenses.

36. The array of claim 34 wherein the lenses face downwardly to direct light downwardly.

37. The array of claim 34 wherein the lenses are hexagonally packed, and a circuit board associated with the lenses, the LED means associated with said board.

38. The system of claim 31 wherein said profile is substantially parabolic.

39. An irradiance-redistribution lens comprising a transparent dielectric formed as a solid of revolution with an axis about which a planar curved profile-line is swept, with external surface area comprised of an optically active entry surface, an optically active exit surface, and an optically inactive mounting surface; said entry surface receiving light of non-uniform irradiance from a compact light source situated on said axis in a nearby focal zone; said entry surface having a specific profile that produces refractive deflection of said received light into interiorly propagating light of a different solid angle; said exit surface opposing said entry surface and receiving said internally propagating light therefrom; said exit surface forming a pre-specified diverging output beam from said internally propagating light; said entry-surface deflection spatially distributed such that said exit surface receives said deflected light with predominantly uniform irradiance, said exit surface given a specific shape that refractively deflects said uniform irradiance into said output beam; said light source being sufficiently compact for said specific shapes to be calculated by mathematical integration of the slope distributions required by said refractive deflections, said entry surface having first concavity facing toward said light source, and second concavity facing toward the entry surface, said second concavity being substantially greater than said first concavity.

40. An illumination system for producing a semicircular beam, comprising the lens of claim 39, modified by being cut in half by a cutting plane passing through said axis of said lens; a vertically oriented planar mirror situated on said cutting plane and extending downward to said nearby compact light source, with said compact light source laterally displaced so as to be positioned thereto for illuminating the entry surface of said lens.

41. The lens of claim 1, and including multiple such lenses in the following combination:
   a) an array of aspheric lenses extending in side-by-side relation,
   b) an array of quasi-hemispheric light sources one for each lens,
   c) each source positioned to direct light at its corresponding lens, and the sources and lenses configured to produce light emitted from the lens array, the emitted light having substantially uniform intensity across an area corresponding to the area of the lens array.

42. The lens of claim 1, and including multiple such lenses in combination with:
   a) an LED package comprising multiple LEDS, the lenses receiving light rays from the LEDs,
   b) and a transparent dielectric having a refracting flat surface to which rays from the LEDs are transmitted for refraction,
   c) the rays refracted from the LEDs at points along the flat surface extending in narrow bands.

43. A light redistribution system comprising, in combination with a lens as defined in claim 1,
   a) said light source comprising LED means,
   b) the lens concave lower refracting surface receiving rays from said LED means,
   c) the lens having a dome-shaped refracting exit surface, the curvature of which is one of the following:
      i) exceeds the curvature of the lower surface,
      ii) is less than the curvature of the lower surface,
   d) there being a target surface receiving rays refracted by said exit surface,
   e) said LED means and said entry and exit surfaces configured to produce a profile of bounded flux at said target surface that provides substantially uniform illuminance.

44. The lens of claim 1 having circularly spaced, flat surface zones which are generally planar in a common direction of said entry and exit surface concavities.

45. The lens of claim 44, wherein multiple such lenses are provided in a cluster and have flat surfaces thereof extending in contiguous relations.

* * * * *